Patented Mar. 12, 1929.

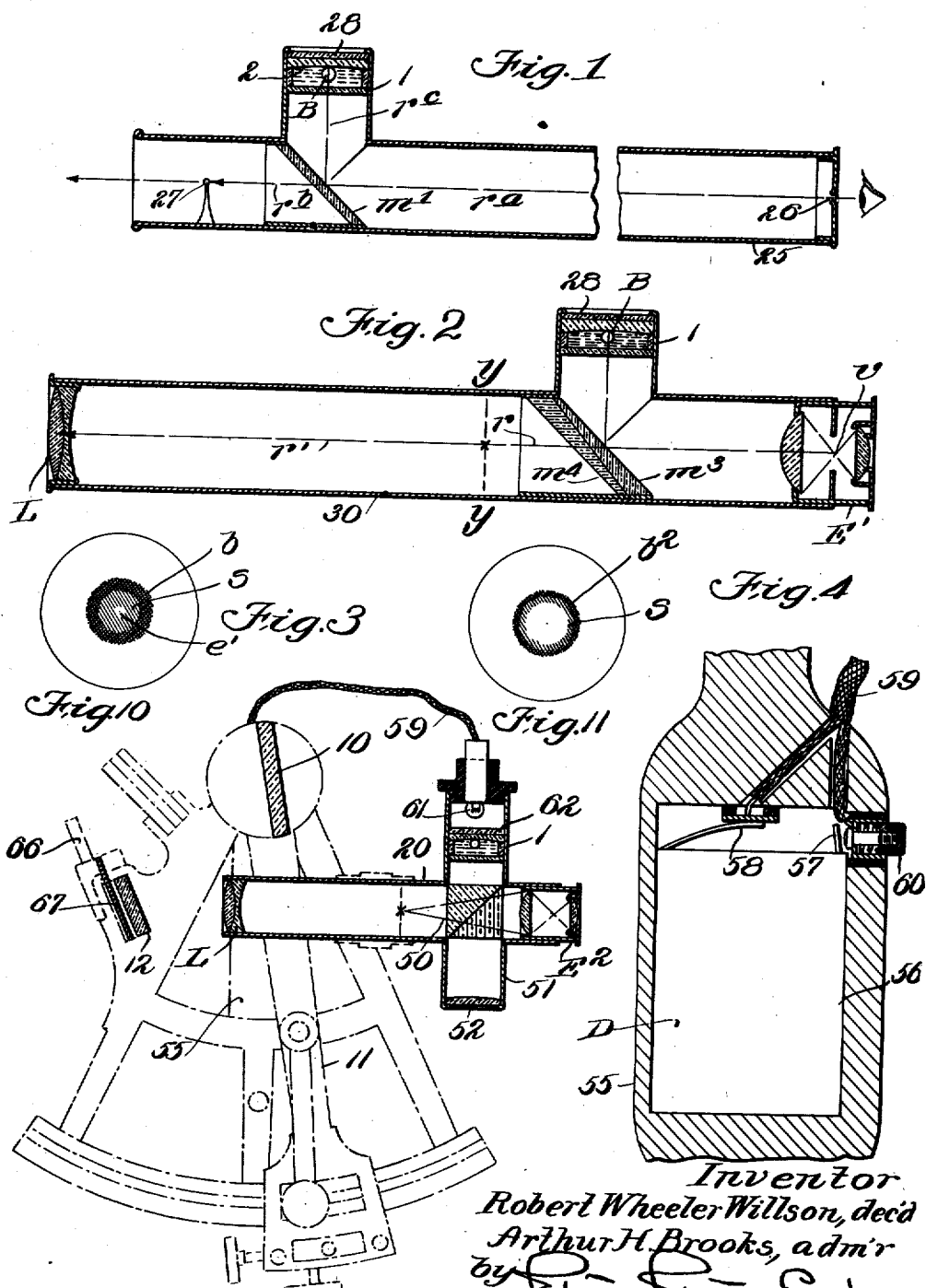

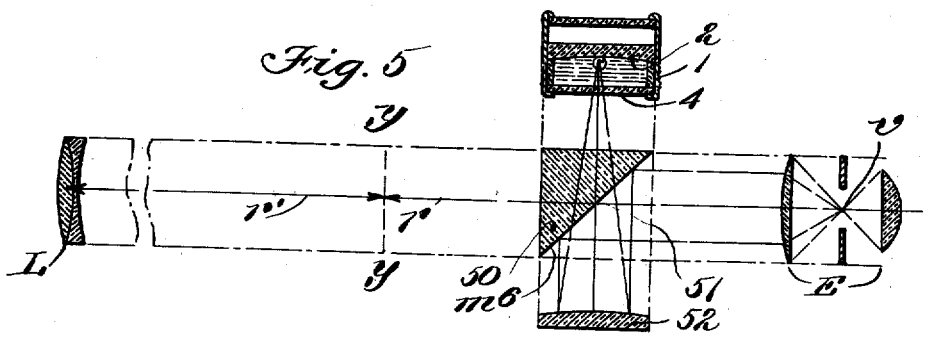
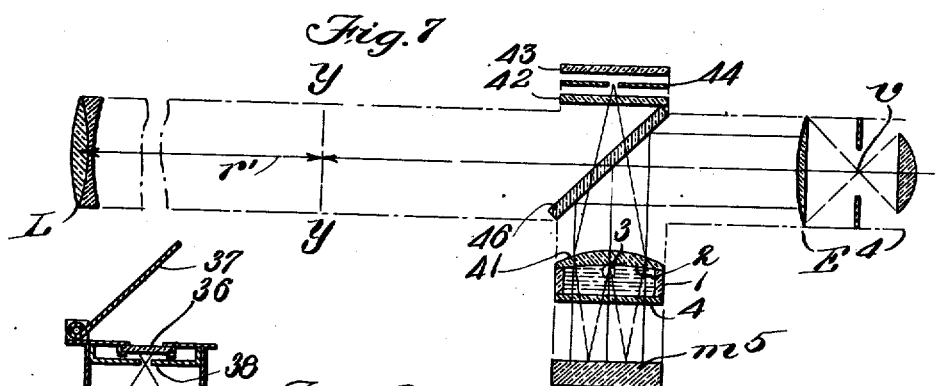
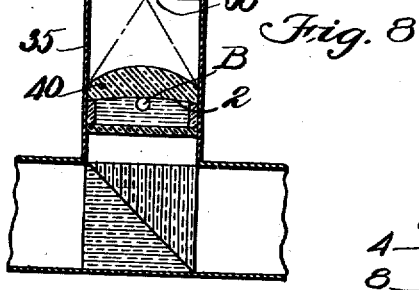
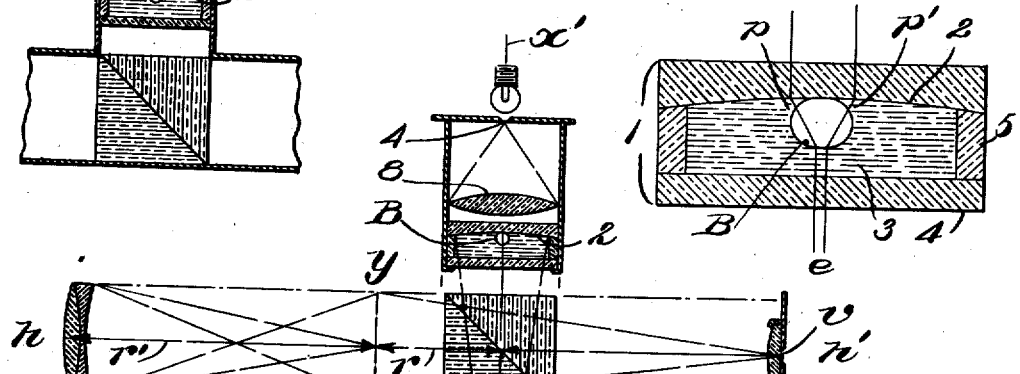
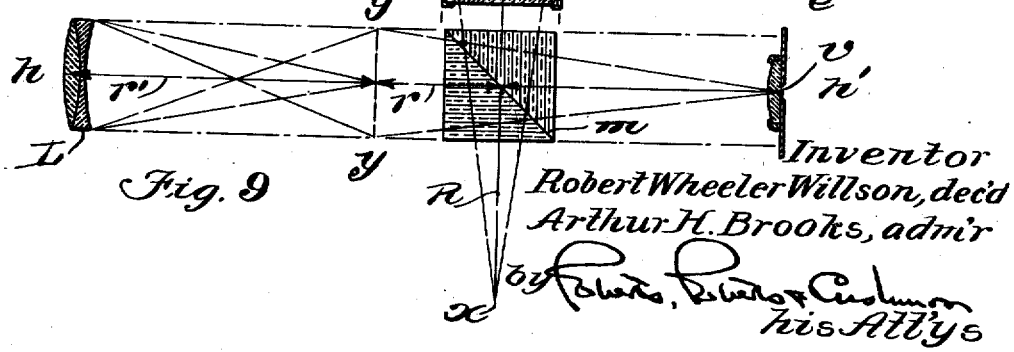

1,705,146

UNITED STATES PATENT OFFICE.

ROBERT WHEELER WILLSON, DECEASED, LATE OF CAMBRIDGE, MASSACHUSETTS, BY ARTHUR H. BROOKS, ADMINISTRATOR, OF CAMBRIDGE, MASSACHUSETTS, ASSIGNOR, BY MESNE ASSIGNMENTS, TO BRANDIS & SONS INC., OF BROOKLYN, NEW YORK, A CORPORATION OF NEW YORK.

INSTRUMENT INCLUDING MEANS FOR DETERMINING THE HORIZONTAL DIRECTION.

Application filed June 11, 1925. Serial No. 36,384.

This invention relates to improved instruments for determining the horizontal direction in relation to a point of observation.

Instruments of the class improved may or may not also include means for observing, measuring or relating the direction of a terrestrial or celestial object or point to the horizontal plane, or means for measuring an angle between the object and such a plane, or between objects in such a plane.

The invention is adapted to use in any situation in which the determination accurately of the relation of any thing to the horizontal direction is desirable or fundamental, such, for instance, as in levels for machine beds, sighting levels for constructors and engineers; artificial horizons; surveyors' levels, theodolites, transits, plane-tables and compasses; mariners' and air-pilots' sextants and quadrants, compasses and gyroscopic compasses; astronomical instruments such as sun-dials, astrolabes, or equatorial, altazimuth, meridian-transit and zenith-transit telescope mountings; mapping, measuring and recording devices employing a photographic image of the object field, and precision cameras in general; to levels associated with instruments such as chemists' balances, galvanometers and seismographs; and the invention therefore includes instrumental levels useful in places in which the relationship of a point or thing to the geodetic vertical or the horizontal derived therefrom is important. The invention is particularly applicable to situations in which means for determining the horizontal or vertical by observation of the natural horizon, or a plumb-line or such device is impracticable or difficult, as for navigation at night or in thick weather; and especially for the navigation of air-ships and air-planes.

Principal objects of the invention are to provide an instrument for the above and other uses which shall give a delicate and trustworthy indication of the horizontal in relation to the direction of gravity at the point of observation; to provide instrumental means for this purpose capable of association with observing and measuring instruments; to provide optical means for accurately determining the relative position of a distant object in respect to the horizontal, independently, within limits, of the actual position of or motion of the observing instrument; and to provide means in such an instrument for rendering the observation direct, simple and capable of being made by relatively unskilled persons.

For these and other purposes the invention includes an improved type of liquid-and-bubble level in association with optical devices establishing a datum-point of little angular magnitude moving with and representing the true position of the bubble, and therefore capable of indicating the position of the level members with increased accuracy; and provides for reading the indication of the level plane by optical comparison either directly with a distant object or if desired, by measured angular reflection or reflections. The invention also includes appropriate auxiliaries for the adjustment of, for mounting and for illuminating its operative parts.

The invention will now be explained for particular specific instances, in connection with sighting levels for miscellaneous uses, for example as a mariner's or air-pilot's sextant, in which the horizontal datum-plane may be obtained by the artificial indication of the instrumental level instead of or alternatively with direct observation of the natural horizon. But it will be understood that the means for indicating the horizontal is in itself capable of the above-mentioned and other uses as well, and that the specific invention in sextants is a species only of the genus constituting the invention.

In the accompanying drawings:

Fig. 1 is a longitudinal section through a simple sighting level embodying a feature of the invention;

Fig. 2 is a similar section illustrating the adaptability of features of the invention to telescopic levels;

Fig. 3 is a longitudinal section through the optical elements of a sextant according to the invention;

Fig. 4 is a longitudinal section through the handle of a sextant showing a mode of housing a primary battery for illuminating the level-bubble of such a sextant;

Fig. 5 is an enlarged diagram in longitudinal section of the level-indicating telescope shown in Fig. 3, illustrative of the optical properties of this part of the instrument;

Fig. 6 is a similar diagram of a bubble level illustrating its optical properties;

Figs. 7, 8 and 9 are diagrams similar to Fig. 5 showing a modification; and

Figs. 10 and 11 are diagrams of visual appearances of telescopic images.

Referring now to the drawings, it is preferred to employ as an indicator of the horizontal direction a bubble or spirit level 1 of which a preferred type is illustrated in the figures, comprising a concave meniscus glass 2, the under surface of which is preferably a segment of a sphere, beneath the underside of which a pool of a limpid fluid 3 is maintained by the remaining walls of a cell comprising a plane-parallel piece of glass 4 and a suitable spacing annulus 5, which may be also of glass ground to fit the margin of the concave face of the meniscus 2. The plane-parallel plate 4, annulus 5 and the meniscus 2 may be held together in any suitable way, preferably by a strong cement such as a viscous solution of water glass, or by fusion, or a fusible cement.

The fluid 3 does not quite fill the cell 2, 4, 5, which contains an air or vapor bubble B to serve as the index.

It is preferred that the fluid 3 shall have an index of refraction of 1.5 or thereabouts in order that parallel light striking the bubble B in a generally vertical direction may be refracted by the virtual meniscus lens made up of the intervening toroid film $p$ and $p'$, Fig. 6, which the viscosity and surface tension of the fluid cause at all times to be retained between the bubble B and the lower surface of the meniscus 2. If the index is about 1.5, parallel light acting through the virtual meniscus $p, p'$, will be brought to an emergent pencil $e$, Fig. 6, greatly smaller than the bubble, and lying in the mean center of figure of the lower surface of the bubble. This little pencil of light is intensely brilliant when the index is viewed from beneath; under proper conditions of illumination the body of the bubble B appears from below as a dark shadow $b$ with a central spot of light $e'$, Fig. 10, representing the rays $e$, occupying its center. Except transmission losses, all of the light which would have been intercepted by the whole bubble is emitted through the spot $e'$ in the parallel rays $e$. When the illumination of the bubble B is from a wide angle of convergent light, the bubble appears as dark ring $b^2$, Fig. 11, concentric with the true central position of the bubble. These central illuminations of the round image of the round or spheroid bubble constitute a fiducial point reliable to indicate the degree of axial deviation of the bubble when the axis of concave 2 is not vertical.

A fluid 3 having the desired limpidity and low solidification point, the desired qualities of surface tension, and particularly the desired index of refraction, is the petroleum derivative xylol, but other liquids are approximately as desirable.

For the purposes of so much of the invention as described above, it is desirable to view the bubble B from beneath and to illuminate the spherical surface 2 and the bubble by parallel light, although many of the new features of this invention may be attained without these provisions, as will presently appear. Referring to Fig. 9 one way of illuminating the bubble B in parallel light is to mount above it a lens 8 having at its principal focus a pin hole aperture 9, which for the purposes of the invention may be wide enough to admit the desired bright illumination. The lens 8 is thus one form of collimator for the illuminating beam of light coming through the aperture 9.

Referring to Fig. 9 it will be apparent that if the level instrument 1 is mounted for free movement, the motions of the mounting of the instrument 1 through the arc measured by the free under surface 2 defined by the annulus 5 cause the bubble 6 under the influence of gravity to move with respect to the instrument about a center $x$ at the radius of curvature of the under surface of the meniscus 2. If this radius of curvature is a distance R, the angular displacement of the bubble B with respect to the point $x$ will measure the angular displacement of the instrument.

If the instrument mounting also includes a mirror $m$ capable of transmitting as well as reflecting light, and mounted at an angle of 45° to the central vertical axis $x, x'$ and to the central horizontal axis $h, h'$ of the mounting, then the apparent motions of the bubble as viewed by reflection in the mirror $m$ from a point $v$ on axis $h, h'$ whose distance 2, $m, v$, is equal to the distance R, will measure the vertical angular displacement of axis $h, h'$.

As observed from the point $v$ the apparent position of the meniscus 2 is now vertical and osculant to the vertical plane $y, y$ displaced behind the intersection of the surface $m$ with the vertical axis $x, x'$ and horizontal axis $h, h'$ by the distance $r$, equal to the axial distance 2, $m$. Supposing the observer's eye to be at the point $v$, tipping the objective end of the instrument down will cause the reflection of the bubble B in $m$ apparently to move down, and tipping the instrument up will cause the reflection of the bubble B apparently to move up. If the principal focal distance $r'$ of the lens L is equal to the radius R of the meniscus 2, and the distance 2, $m$, $v$, which is the preferred proportion of the optical elements, the inverted real image of any distant object through lens L on the plane $y$, $y$, appearing to be coincident with the image of the bubble B is in the horizontal plane of the observer's eye, no matter what the position of the parts within the angle subtended by the path of free motion of the bubble in the field of view. If as in the preferred case, the point $v$ is the nodal point of one of the magnifying eye-pieces $E^1$, $E^2$, $E^3$, $E^4$, $E^5$, of a telescope, of which the line $h$, $h'$ is the optical axis of an objective L having its principal focus in the plane $y$, $y$, then the real image of the object, terrestrial or celestial, from the lens L formed at plane $y$, $y$ will have the apparent motions in respect to the axis $h$, $h'$ through the same distances in the same directions and at the same rates as the bubble B whenever the axis $h$, $h'$ is moved.

By these arrangements the bubble B, whenever it is in the field of view by an approach to the horizontal of the axis $h$, $h'$, is always in visual coincidence with any image of the true horizon through the lens L. If now, by reflection, the image formed by objective L of a celestial object in the vertical plane of the instrument is brought into apparent coincidence with the image of bubble B by an angular motion of a reflector away from a position causing the image of the horizon to coincide with that of the bubble, the motion of the reflector is through one-half the altitude of the celestial object. For instance, the image of a celestial object reflected from the index mirror 10 on the radius arm 11 and the horizon glass 12 of a sextant or other altimeter of which the observing telescope 20 is provided with one of the instruments 1 and its appurtenances may be brought into line with the bubble by superposing the image of the fiducial point and the image of the celestial object by motion of the radius arm 11, with the great advantage that both images are in the field of view and both moving in the same direction whatever the unsteadiness [within the angle of view] of the observer and of the instrument. The solar image S, Fig. 10 is merely brought into concentric relation with the bubble shadow $b$ and the fiducial point bright spot $e'$. If the original position of arm 11 was such as to cause the horizon and the bubble image to coincide, the angular motion of arm 11 is the required reading, and it is not necessary to be able to see the true horizon.

The observing instrument, it will now be apparent, may have many different convenient forms within the invention. Topographers, mechanics, engineers, soldiers and others have many uses for sighting land levels, which as shown in Fig. 1 may comprise nothing more elaborate than a tube 25 having an eye-hole 26, a bead sight 27, a mirror $m^1$ of plane unsilvered glass, a level L whose meniscus surface 2 is of the radius of curvature $r^a$, $r^c$, which is also the distance 26, 27, and a colored screen-glass 28 above the level 1. In use, the place level with the observer's eye is the place in line with the bead sight and the center of the reflection of the bubble B which is at the optical focal distance of the bead 27. The error of refractive parallax of the glass $m^1$ is a constant error, compensated for by the set position of the bead 27.

For greater accuracy and to avoid coordinating with any mark showing the instrument axis, the telescopic form of Fig. 2 may be employed, comprising the telescope 30 whose objective L has a principal focus $r^1$ on plane $y$, $y$, coincident with the focal distance of eye-piece $E'$ and the distance by reflection in an inclined mirror $m^3$ from the nodal point $v$ of the eye-piece of the bubble B in a level 1. The glasses $m^3$ $m^4$ may be prisms of different indices of refraction adapted to transmit an axial beam without offset parallax, as will occur when their respective refractions for the visual maximum wave-length are complementarily less and greater than the angle of deviation of incident light in respect to the position of the juncture plane of the prism, and the prisms are of the same thickness at their centers.

In the instances mentioned, the bubble level may be accurately mounted in a perpendicular branch of the sight-tube, and the transparent mirror for observing it may occupy a position across the juncture with the sight-tube.

For use in sextants, surveyors' levels and theodolites, where the fiducial-point spot $e'$ in the bubble image is most useful, an optical system securing parallel light transmitted through the bubble is recommended, as described in connection with Fig. 9. Arrangements for this purpose may vary. As shown in Fig. 8, for example, the erect tube 35 in which the level 1 is mounted may carry a colored screen 36 and a daylight reflector 37 of white material, a hole in a diaphragm 38 being at the principal focus of a concavo-convex lens 40, the concave face of which provides the meniscus surface 2 for the bubble B as above described.

As shown in Fig. 7, a longer-focus concavo-convex lens 41 may be similarly employed with a level 1 below the axis of the sight tube, with an illuminating colored glass screen or screens 42, 43 and replaceable diaphragm 44 above the light tube, a plane mirror $m^5$ beneath the level, and a plane parallel glass reflector 46, the lower face of which may be half-silvered, at 45° to the axis of the sight tube. The effect of this is to cause the rays from the opening in diaphragm 44 to be collimated to parallel by lens 41, and to be reflected in this state at $m^5$. The fiducial-spot pencil $e$, Fig. 10, is thus reflected back through lens 41 and from the under surface of mirror 46 to eyepiece E⁴. The distance $v, y$ is equal to the radius of surface 2 as before. Consideration of the figure will show that optically the bubble B virtually moves in the plane $y, y$. The device of the second reflection at $m^5$ is useful for compactness and to accommodate a greater length of telescope and a wider angle of field of vision, and also because the relatively parallel state of the light between the reflector 46, the reflector $m^5$ and the bubble B permits an image by reflection from mirror 46 without a double image from the top and the bottom surfaces of mirror 46 respectively.

In the form shown in Figs. 3 and 5, preferred in some cases, particularly for sextants, the reflecting surface across the axis of the telescope 20 may be the bare or lightly-silvered hypothenuse face $m^6$ of a 90° prism 50, which may be supplemented by a second prism 51, if desired. The bubble level is above the telescope and is viewed by downward reflection from reflector $m^6$ in a convex mirror 52 and transmission through the prism 50; and through the prism 51, if employed.

In each of the forms uses for night or for aeronautic navigation imply artificial illumination of the field behind the bubble image. As shown in Figs. 3 and 4, the handle 55 of the sextant shown in Fig. 3 may be recessed at 56 to receive a dry battery D, provided with contacts at 57 and 58 to a conductor cable 59, one of these contacts being controlled by a push button switch 60, Fig. 4, convenient to the observer's thumb. Cable 59 carries current for a suitable incandescent lamp 61 mounted above a colored screen 62 in the upper end of the cross tube for the level 1. As shown in Fig. 3, the filament of the lamp may be so small as to avoid use of a diaphragm or arrangements for parallel beam illumination. Any suitable variable resistance in circuit with the lamp 61, or exchangeable diaphragms or screens may be employed for regulating the amount of the illumination.

When the screen 62 is translucent, the illumination of the bubble B is from diverse directions, and its image has the annular form shown at $b^2$ in Fig. 11. The magnitude of the bubble may be such as to cause this annulus nearly to correspond in diameter to the solar image S. For stellar observation, a star image may be centered in the ring shadow $b^2$ in a field otherwise faintly illuminated with colored light from screen 62 with entire ease.

The artificial horizontal indication of the bubble sextant need not prevent sextants containing it from use in the usual way when the real horizon is not obscured. The usual horizon shade glasses 66 may be supplemented by an opaque screen 67 for use when the artificial horizontal is being observed. Removal of the screen 67 converts the instrument instantly to the ordinary type of sextant.

As a navigation instrument, a great advantage of this invention is the operative efficiency permitting an altitude angle to be measured by coordination of two appearances only, while the observer and the instrument are oscillating through any angle less than the angle of the field of view. Bubble levels of the described type have moreover, so rapid a response to forces and so short a natural time of oscillation as to enable the relatively slow accelerations, pitching and rolling motion of air-planes and small ships to be left out of account. There is no appreciable natural oscillation period of the bubble-cell liquid to enter as an error into the reading of the indications.

What is claimed is:

1. A liquid level, the liquid having an index of refraction of substantially 1.5 for light of the wave-length of maximum luminosity.

2. A liquid level having a concave transparent upper wall, the liquid having an index of refraction of substantially 1.5 for light of the wave-length of maximum luminosity.

3. A liquid level comprising a transparent cell containing xylol and a gaseous bubble therein.

4. In an instrument for determining the horizontal direction in relation to a point of observation the combination of a transparent liquid level containing a liquid of an index of refraction of substantially 1.5, a bubble therein, means for observing the bubble from the under side, and means for illuminating the bubble by transmitted substantially parallel light.

5. In an instrument for determining the horizontal direction in relation to a point of observation the combination of a transparent liquid level containing xylol, a bubble therein, means for observing the bubble from the under side, and means for illuminating the bubble by transmitted substantially parallel light.

6. The combination with a telescope having an objective and a transparent reflector at an angle to its axis, of a bubble level adapted to be observed in said reflector, said level having a spherical surface of a radius equal to the principal focal length of said objective.

7. The combination with a telescope having an objective and a transparent reflector at an angle to its axis, of a bubble level adapted to be observed in said reflector, said level having a spherical surface of a radius equal to the principal focal length of said objective and an eye piece on the optical axis of the objective having a nodal point distant by reflection in said reflector from the said spherical surface by a distance equal to said radius.

8. The combination in a telescope of an objective, a bubble level having a surface of circular cross-section, a transparent reflector, and an eye-piece, the distance to said surface by reflection in said reflector from the nodal point of the eye-piece and to the image-plane of the objective being substantially same and equal to the radius of said surface.

Signed by me at Boston, Massachusetts, this eighth day of June, 1925.

ARTHUR H. BROOKS,
*Administrator of Robert Wheeler Willson, Deceased.*